United States Patent

Ishihara et al.

[11] Patent Number: 6,032,110
[45] Date of Patent: Feb. 29, 2000

[54] LATERAL POSITIONING DETECTING APPARATUS FOR MOVING BODY

[75] Inventors: Toshihisa Ishihara, Nukata-gun; Takahide Kitahara, Nishio; Shigeto Tsuge, Okazaki, all of Japan

[73] Assignee: Nippon Soken, Inc., Nishio, Japan

[21] Appl. No.: 09/114,931

[22] Filed: Jul. 14, 1998

[30] Foreign Application Priority Data

Aug. 28, 1997 [JP] Japan ................................. 9-233026

[51] Int. Cl.[7] ........................ G05D 1/02; G01B 7/14
[52] U.S. Cl. ...................... 702/150; 702/94; 702/95; 324/207.11; 324/207.13; 324/236; 324/246
[58] Field of Search ......................... 702/150, 94, 95; 701/23, 207; 180/167–168; 324/207.11–207.14, 207.22, 236, 245, 246

[56] References Cited

U.S. PATENT DOCUMENTS

| 4,087,791 | 5/1978 | Lemberger | 342/44 |
| 4,613,804 | 9/1986 | Swenson | 180/168 |
| 4,634,973 | 1/1987 | Murakami et al. | 324/207.13 |
| 4,800,978 | 1/1989 | Wasa et al. | 324/207.12 |
| 4,847,774 | 7/1989 | Tomikawa et al. | 701/23 |
| 4,990,841 | 2/1991 | Elder | 180/168 |
| 5,287,112 | 2/1994 | Schuermann | |
| 5,347,456 | 9/1994 | Zhang et al. | 701/23 |

Primary Examiner—Marc S. Hoff
Assistant Examiner—Bryan Bui
Attorney, Agent, or Firm—Pillsbury Madison & Sutro LLP

[57] ABSTRACT

Markers each comprising an electromagnetic coil are installed on the surface of a road at a lateral center line of a running lane of the road at predetermined intervals. Provided for each of the markers, a driving signal generating circuit drives the associated marker so that the marker transmits an alternating current magnetic field. Alternating current magnetic field receiving devices each comprising an electromagnetic coil are installed on the front bumper of a vehicle at positions symmetrical with respect to the lateral center line of the vehicle. While the vehicle is running, the alternating current magnetic field receiving devices sequentially receive the alternating current magnetic fields generated by the markers one field after another. A microcomputer receives detection voltages generated by the alternating current magnetic field receiving devices through detection circuits and determines the lateral position of the vehicle from the detection voltages.

10 Claims, 11 Drawing Sheets

| Vm\Rv | Rv0 | Rv1 | ..... | Rvj | ..... |
|---|---|---|---|---|---|
| Vm0 | L00 | L01 | | L01 | |
| Vm1 | L10 | L11 | | | |
| ⋮ | | | | | |
| Vmi | Li0 | | | Lij | |
| ⋮ | | | | | |

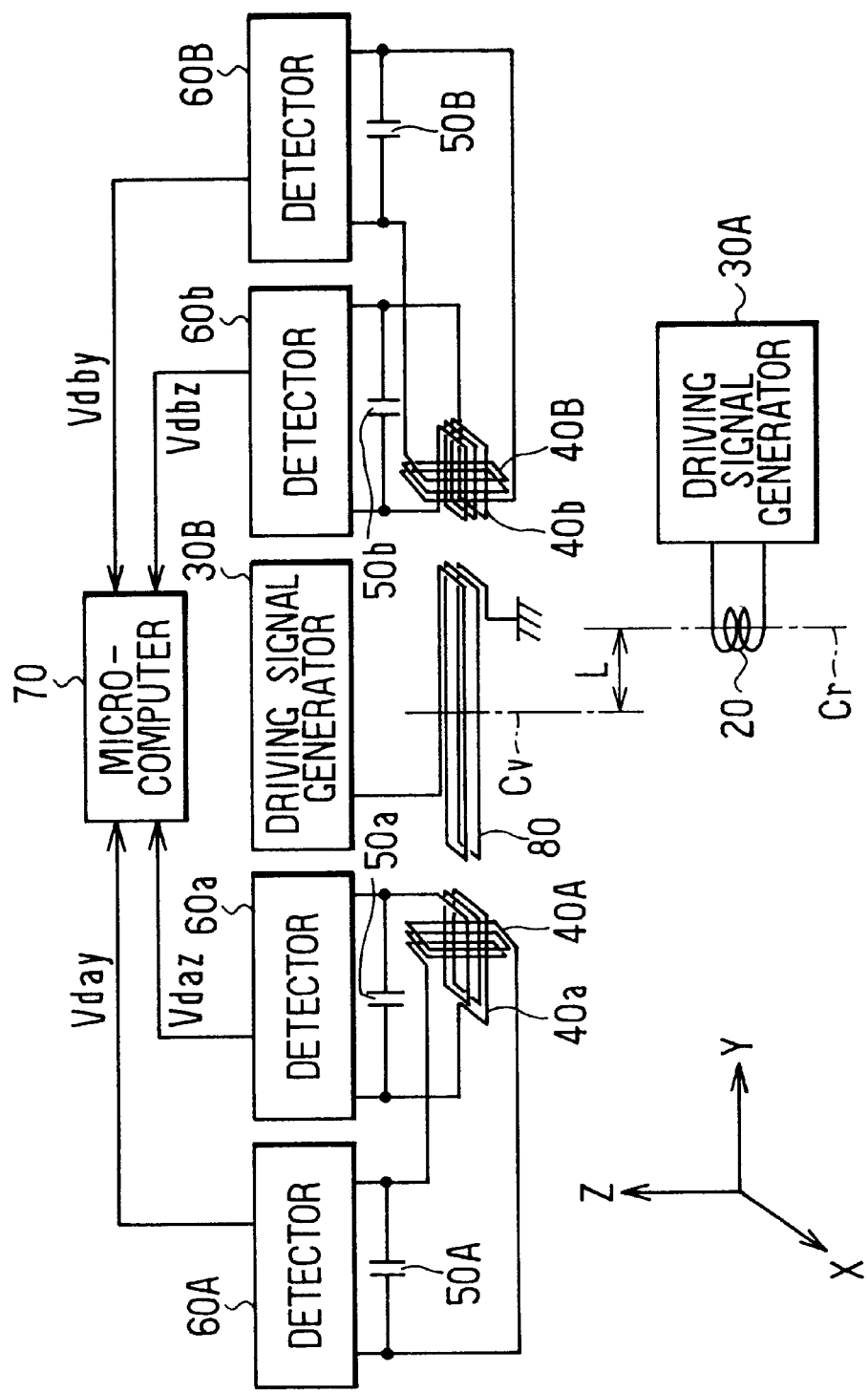

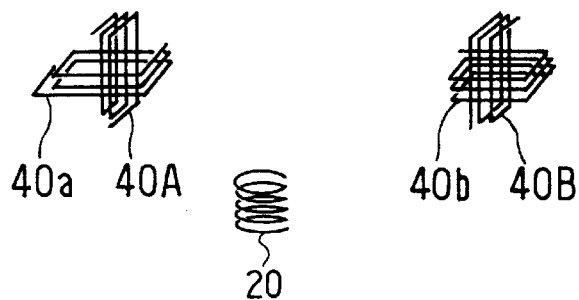
FIG. 11A
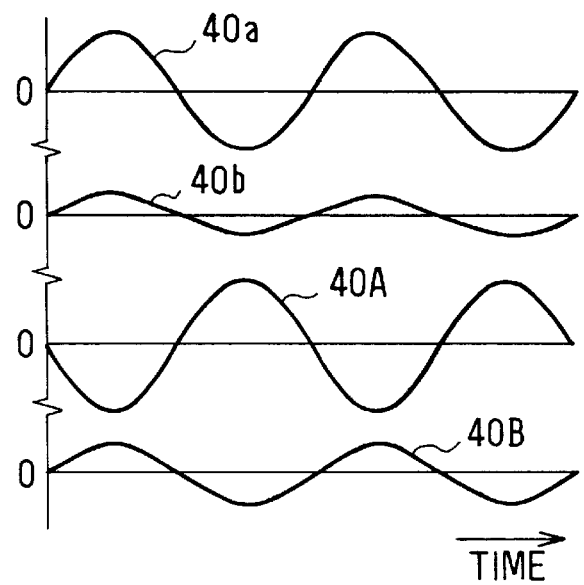
FIG. 11B
FIG. 14
| Vy \ Vz | Vz0 | Vz1 | ..... | Vzj | ..... |
|---|---|---|---|---|---|
| Vy0 | L00 | L01 | | | |
| Vy1 | L10 | L11 | | | |
| ⋮ | | | | | |
| Vyi | | | | Lij | |
| ⋮ | | | | | |

# LATERAL POSITIONING DETECTING APPARATUS FOR MOVING BODY

CROSS REFERENCE TO RELATED APPLICATION

This application relates to and incorporates herein by reference Japanese Patent Application No. 09-233026 filed on Aug. 28, 1997.

BACKGROUND OF THE INVENTION

1. Field of the Invention

The present invention relates to a lateral position detecting apparatus for detecting the lateral position of a moving body such as a running vehicle.

2. Description of Related Art:

There is disclosed in U.S. Pat. No. 5,347,456 a conventional lateral position detecting apparatus. In this lateral position detecting apparatus, a magnetic field receiving device mounted on a vehicle is used for determining the lateral position of the vehicle running on a road by detection of a magnetic field generated by a plurality of markers installed on the surface of the road along the lateral center line of the road at certain intervals in the longitudinal direction.

In the conventional apparatus, however, the magnetic receiving device may receive the magnetic field generated by magnetized iron and steel bars used in a bridge or generated by the geomagnetism of the earth by mistake as if the magnetic field were generated by the markers. As a result, the conventional lateral position detecting apparatus has a problem that the accuracy of detection of the lateral position of the vehicle is deteriorated.

Specifically, since the markers are each also made of a permanent magnet, the markers generate a static magnetic field similar to that generated by magnetized iron and steel bars of the bridge or generated by the geomagnetism of the earth, making it impossible for the magnetic field receiving device to distinguish those from each other. As a result, it is obvious that the accuracy of detection of the lateral position of the vehicle is running is deteriorated.

This may be solved by employing magnetic field transmitting devices each for generating an alternating current magnetic field as markers. However, as the alternating current magnetic field varies alternately, an electromagnetic induction effect which is not observed in the case of a static magnetic field is induced.

SUMMARY OF THE INVENTION

It is thus an object of the present invention to provide a lateral position detecting apparatus used for detecting the lateral position of a running body with a high degree of accuracy by using alternating current magnetic field transmitting devices each for generating an alternating current magnetic field as markers.

According to one aspect of the present invention, alternating current magnetic field transmitting devices are installed on the surface of a running path of a moving body along the lateral center line of a running lane of the running path at predetermined intervals in the longitudinal direction. Driving units are each used for driving one of the alternating current magnetic field transmitting devices so that the alternating current magnetic field transmitting device generates an alternating current magnetic field. An alternating current magnetic field receiving unit is installed on a moving body and used for sequentially receiving the alternating current magnetic fields transmitted by the alternating current magnetic field transmitting devices while the moving body is moving.

As a result, by using each of the alternating current magnetic field devices as a marker, the lateral position of the moving body can be detected with a high degree of accuracy which is not affected by static magnetic fields generated by a bridge existing in proximity to the moving body and the geomagnetism of the earth.

According to another aspect of the present invention, an electric power conveying magnetic field transmitting device is installed on a lower portion of a moving body moving along the surface of a running path. A driving unit for the electric power conveying magnetic field transmitting device is used for driving the electric power conveying magnetic field transmitting device so that the electric power conveying magnetic field transmitting device transmits an alternating current magnetic field as an electric power conveying magnetic field. The alternating current magnetic field transmitting devices are installed on the surface of the running path of the moving body at a lateral center line of a running lane of the running path at predetermined intervals in the longitudinal direction and used for sequentially receiving the electric power conveying magnetic field transmitted by the electric power conveying magnetic transmitting device while the moving body is moving. The alternating current magnetic field transmitting device driving units are used for sequentially driving the alternating current magnetic field transmitting devices on the basis of the electric power conveying magnetic field received from the alternating current magnetic field transmitting devices so that the alternating current magnetic field transmitting devices each transmit an alternating current magnetic field. The alternating current magnetic field receiving unit is installed on the lower portion of the moving body and used for sequentially receiving the alternating current magnetic fields transmitted by the alternating current magnetic field transmitting devices while the moving body is moving. A lateral position detecting unit is provided on the moving body and used for detecting a lateral position of the moving body on the basis of the alternating current magnetic fields sequentially received by the alternating current magnetic field receiving unit.

BRIEF DESCRIPTION OF THE DRAWINGS

Other objects, features and advantages of the present invention will be made more apparent by the following detailed description with reference to the accompanying drawings. In the drawings:

FIG. 10 is a block diagram showing a third embodiment of the present invention;

FIG. 11A is a schematic view showing positions of magnetic field receiving devices and a marker employed in the third embodiment;

FIG. 11B is a waveform chart showing signals generated by the magnetic field receiving devices shown in FIG. 11A;

FIG. 14 is a map showing a relation among a distance and voltages;

DETAILED DESCRIPTION OF THE PREFERRED EMBODIMENT

<First Embodiment>

Figure 1:
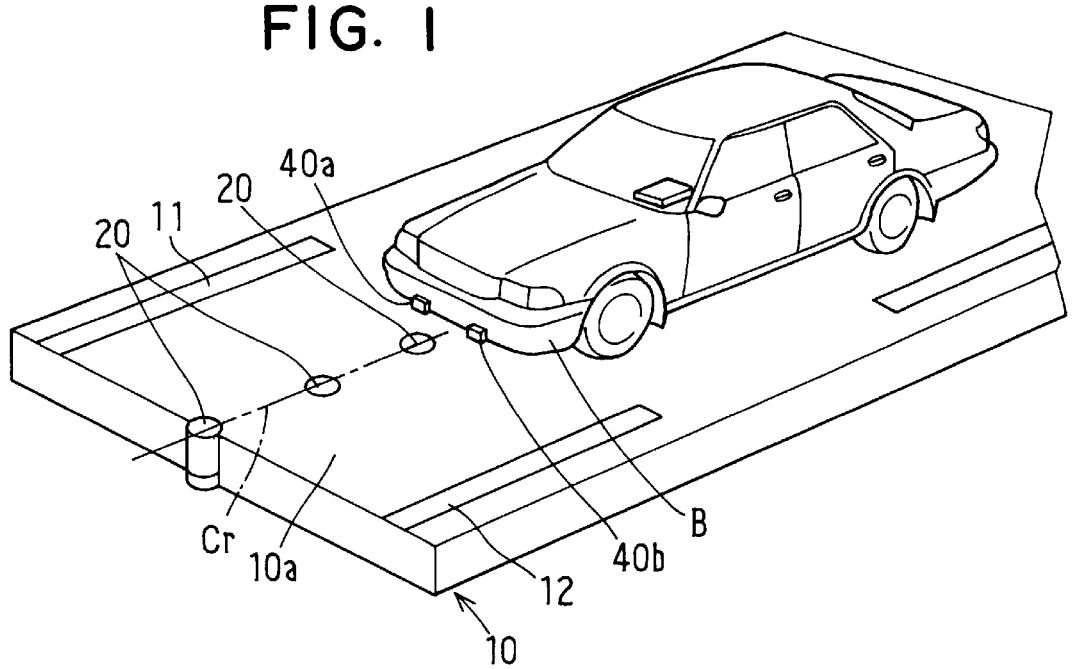
FIG. 1 is a schematic view showing an entire system of the present invention, including markers on a road and a pair of magnetic field receiving devices on a vehicle.
Figure 2:
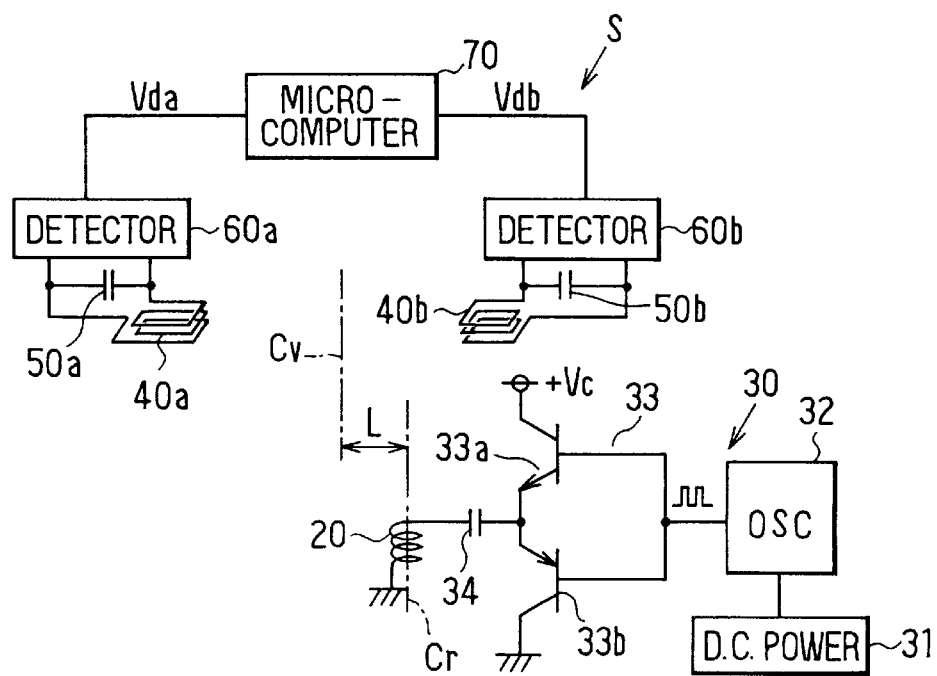
FIG. 2 is a block diagram showing an electrical circuit of a first embodiment of the present invention.

Referring to FIGS. 1 and 2, a plurality of markers 20 are installed on the surface of a road 10 along the lateral center line Cr at the lateral center of a travel lane 10a of the road 10 at predetermined intervals. The center line Cr is at the middle between lane marks 11 and 12 on both sides of the road The markers 20 are each an electromagnetic coil connected to a driving signal generating circuit 30. It should be noted that the center axis of each of the markers 20 is oriented in the vertical direction against the road surface.

The driving signal generating circuit 30 comprises a direct current power supply 31 and an oscillation circuit 32. The oscillation circuit 32 oscillates with electric power supplied by the direct current power supply 31, generating a pulse signal at a predetermined frequency.

The driving signal generating circuit 30 also includes a driving circuit 33 and a capacitor 34 which forms a series resonance circuit in conjunction with the marker 20. The driving circuit 33 comprises transistors 33a and 33b which are driven into a conduction state alternately by pulses of the oscillating pulse signal generated by the oscillation circuit 32.

A pulse voltage appearing at the junction terminal between the transistors 33a and 33b is applied to the capacitor 34 of the series resonance circuit, causing series resonance to take place in the series resonance circuit comprising the marker 20 and the capacitor 34 at a fixed resonance frequency. As a result, the marker 20 generates an alternating current electromotive force having a sinusoidal waveform due to electromagnetic induction.

The alternating current electromotive force generated by the marker 20 causes an alternating current magnetic field to be radiated. It should be noted that each of the driving signal generating circuits 30 can be installed in the road 10 along with the marker 20 associated with the driving signal generating circuit 30 or at a proper location in close proximity to the road 10.

A main body S is installed at a proper location in a vehicle. The main body is provided with a pair of magnetic field receiving devices 40a and 40b each for receiving the alternating current magnetic field transmitted by the maker 20. As shown in FIG. 1, the magnetic field receiving devices 40a and 40b are installed typically on the front bumper B of the vehicle at positions symmetrical with respect to the center line of the bumper B in the lateral direction. It should be noted that the lateral line of the bumper generally coincides with the center line Cr of the vehicle shown in FIG. 2.

The magnetic field receiving devices 40a and 40b are each an electromagnetic coil. The electromagnetic coils of the magnetic field receiving devices 40a and 40b have a uniform shape and are wound in the same winding direction. The center lines of the magnetic field receiving devices 40a and 40b are both oriented in the vertical direction.

When receiving the alternating current magnetic field from the maker 20, the magnetic field receiving devices 40a and 40b responds electromagnetically to the magnetic field generated by the markers 20, generating alternating current electromotive forces Va and Vb respectively. The distance from the longitudinal direction center line Cv of the vehicle to the longitudinal direction center line Cr of the road 10 be denoted by a symbol L in FIG. 2. In this case, the relation between the alternating current electromotive force Va generated by the magnetic field receiving device 40a and the distance L is represented by curve denoted by a symbol P in FIG. 3. On the other hand, the relation between the alternating current electromotive force Vb generated by the magnetic field receiving device 40b and the distance L is represented by curve denoted by a symbol Q in FIG. 3.

Here, the positive value of the distance L indicates that the longitudinal direction center line Cv of the vehicle is located on the right side of the longitudinal direction center line Cr of the road 10 as seen in the forward moving direction of the vehicle. On the contrary, the negative value of the distance L indicates that the longitudinal direction center line Cv of the vehicle is located on the left side of the longitudinal direction center line Cr of the road 10 as seen in the forward moving direction of the vehicle as shown in FIG. 2. Finally, a zero value of the distance L indicates that the longitudinal direction center line Cv of the vehicle coincides with the longitudinal direction center line Cr of the road 10.

The apparatus main body S is provided with a pair of capacitors 50a and 50b, a pair of voltage detecting circuits 60a and 60b and a microcomputer 70. The capacitor 50a constitutes a parallel resonance circuit in conjunction with the magnetic field receiving device 40a. The alternating current electromotive force Va generated by the magnetic field receiving device 40a causes resonance to occur in the parallel resonance circuit, generating a resonance voltage with a sinusoidal waveform between the terminals of the capacitor 50a. Similarly, the capacitor 50b constitutes a parallel resonance circuit in conjunction with the magnetic field receiving device 40b. The alternating current electromotive force Vb generated by the magnetic field receiving device 40b causes resonance to occur in the parallel resonance circuit, generating a resonance voltage with a sinusoidal waveform between the terminals of the capacitor 50b.

The voltage detecting circuit 60a detects the amplitude of the resonance voltage appearing across the capacitor 50a, generating a detection voltage Vda. Similarly, the voltage detecting circuit 60b detects the amplitude of the resonance voltage appearing across the capacitor 50b, generating a detection voltage vdb.

Figure 4:
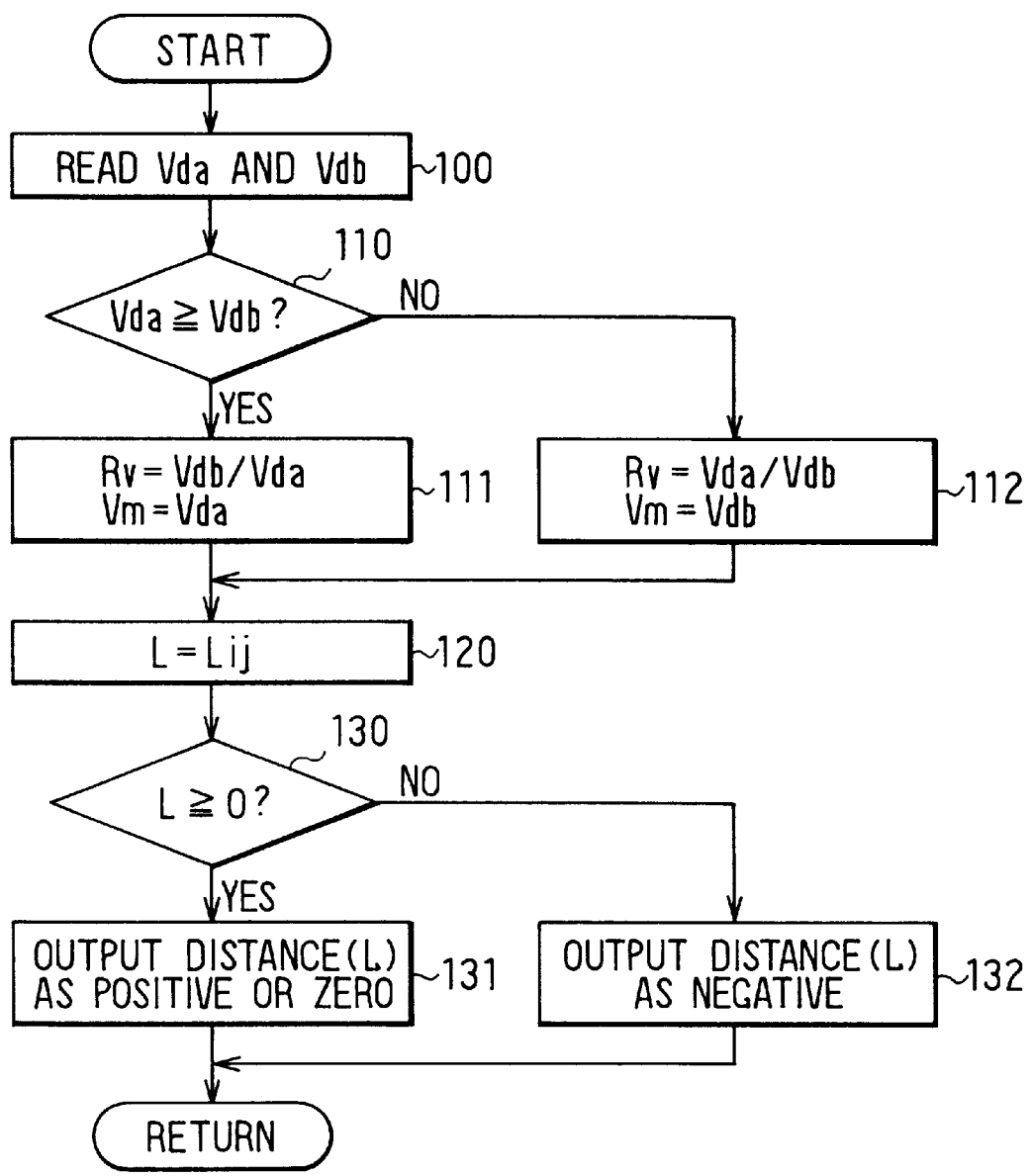
FIG. 4 is a flowchart showing operations carried out by a microcomputer employed in the first embodiment.

The microcomputer 70 executes a programmed process shown by a flowchart of in FIG. 4, computing the distance L from the detection voltages Vda and Vdb generated by the voltage detecting circuits 60a and 60b respectively. It should be noted that the program is stored in a ROM unit employed in the microcomputer 70.

Figures 3, 5:
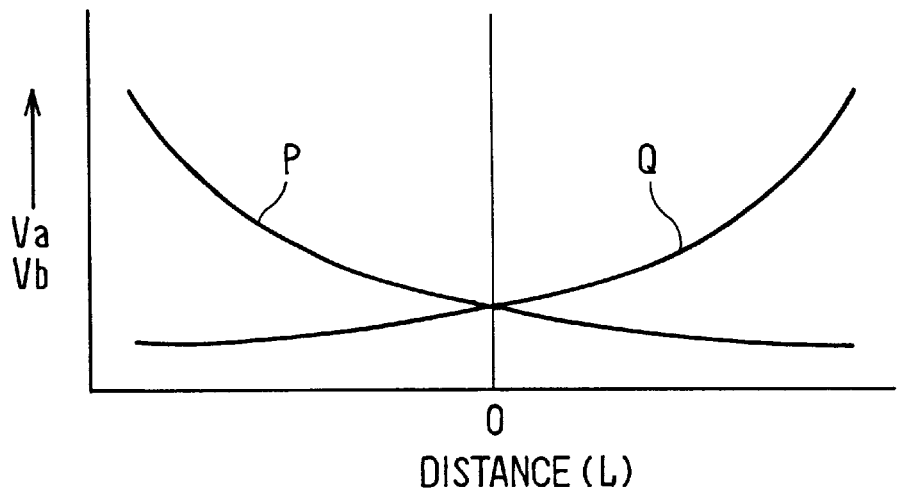
FIG. 3 is a graph showing relations between alternating current electromotive forces generated by two magnetic field receiving devices employed in the first embodiment shown in FIG. 2 and a distance.
FIG. 5 is a map showing a relation among the distance, a voltage and a voltage ratio.

In the first embodiment, during the execution of the program, a map shown in FIG. 5 is used as data for finding the distance L. For a value Vmi of a voltage Vm and a value Rvj of a voltage ratio Rv, the map provides a value Lij for the distance L. It should be noted that the values of the suffixes i and j of Vmi, Rvj and Lij are i=0, 1, 2, - - - and j=0, 1, 2, - - - . The map shown in FIG. 5 is stored in the ROM unit employed in the microcomputer 70.

If the detection voltage Vda is equal to or higher than the detection voltage Vdb, Vdb/Vda is taken as the value Rvj of the voltage ratio Rv and the detection voltage Vda is taken as the value Vmi of the voltage Vm. If the detection voltage Vda is lower than the detection voltage Vdb, on the other hand, Vda/Vdb is taken as the value Rvj of the voltage ratio Rv and the detection voltage Vdb is taken as the value Vmi the voltage Vm.

The microcomputer 70 starts execution of the program of FIG. 4 while the vehicle is running along the travel lane 10a of the road 10.

When the driving signal generating circuits 30 drive the markers 20 to generate alternating current magnetic fields, while the vehicle is running, the magnetic field receiving devices 40a and 40b receive the alternating current magnetic fields generated by the markers 20, generating alternating current electromotive forces Va and Vb respectively.

In this case, even if a static magnetic field is generated by a bridge in close proximity to the vehicle or the geomagnetism of the earth and received by the magnetic receiving devices 40a and 40b, the alternating current electromotive forces are not affected by the static magnetic field because the static magnetic field does not change instantaneously.

Not affected by such a static magnetic field, the values of alternating current electromotive forces Va and Vb can be assured with a high degree of accuracy and determined only by the alternating current magnetic fields transmitted by the markers 20.

When alternating current electromotive forces Va and Vb generated by the magnetic field receiving devices 40a and 40b causes resonance to occur in the parallel resonance circuits comprising the magnetic field receiving devices 40a and 40b and the capacitors 50a and 50b, generating resonance voltages each with a sinusoidal waveform between the terminals of the capacitors 50a and 50b.

If the parallel resonance circuits are designed so that the resonance voltages appearing across the capacitors 50a and 50b each resonate at a resonance frequency different from frequencies caused by external disturbances such as natural phenomena around the vehicle, originators of the resonance voltage can be limited to the alternating current magnetic fields generated by the markers 20, making the resonance voltages immune from external disturbances.

Then, the voltage detecting circuits 60a and 60b detect the amplitudes of the resonance voltages appearing across the capacitors 50a and 50b respectively, generating the detection voltages Vda and Vdb respectively.

In this case, the alternating current electromotive forces generated by the magnetic field receiving devices 40a and 40b are both not affected by the magnetic flux of a static magnetic field and the resonance voltages appearing across the capacitors 50a and 50b are thus not affected by a variety of external disturbances. As a result, the detection voltages Vda and vdb have values with an accuracy not affected by a static magnetic field and a variety of external disturbances either.

The program shown in FIG. 4 begins with step 100 at which the detection voltages Vda and Vdb generated by the voltage detecting circuits 60a and 60b respectively are read and converted into digital data by the microcomputer 70. For the sake of convenience, digital conversion voltages represented by the digital data are referred to hereafter as the detection voltages Vda and Vdb. The program then goes on to step 110 at which the microcomputer 70 compares the detection voltages Vda and Vdb with each other to determine which voltage is higher.

If the detection voltage Vda is equal to or higher than the detection voltage Vdb, that is, if the outcome of the determination at step 110 is YES, the program proceeds to step 111 at which the value Vmi of the voltage Vm is set at Vda and the value Rvj of the voltage ratio Rv is found by computing a ratio of vdb to Vda (Vdb/Vda).

Then, the program continues to step 120 at which the value Lij of the distance L is found from the map data shown in FIG. 5 by using the detection voltage Vda as the value Vmi and the ratio (Vdb/Vda) as the value Rvj. In this case, if i=1 and j=0, for example, L10 is found as the value Lij of the distance L.

After the value Lij of the distance is determined, the program goes on to step 130 to determine whether the distance L is positive or negative. In the present case, since the detection voltage Vda is equal to or higher than the detection voltage Vdb, the outcome of the determination at step 130 is YES, indicating that the distance L is not negative. In this case, the program proceeds to step 131 at which the value Lij of the distance L is output as a positive value or a zero. The positive or zero output value Lij of the distance L represents a detected lateral position of the vehicle.

If the detection voltage Vda is lower than the detection voltage Vdb, on the other hand, the outcome of the determination at step 110 is NO. In this case, the program proceeds to step 112 at which the value Vmi of the voltage Vm is set at Vdb and the value Rvj of the voltage ratio Rv is found by computing a ratio of Vda to Vdb (Vda/Vdb).

Then, the program continues to step 120 at which the value Lij of the distance L is found from the map data shown in FIG. 5 by using the detection voltage Vdb as the value Vmi and the ratio (Vda/Vdb) as the value Rvj.

After the value Lij of the distance is determined, the program goes on to step 130 to determine whether the distance L is positive or negative. In the present case, since the detection voltage Vda is lower than the detection voltage vdb, the outcome of the determination at step 130 is NO, indicating that the distance L is negative. In this case, the program proceeds to step 132 at which the value Lij of the distance L is output as a negative value. The negative output value Lij of the distance L represents a detected lateral position of the vehicle.

In this case, since the detection voltages Vda and vdb each have a value with an accuracy that is not affected by a static magnetic field and external disturbances, the lateral position of the vehicle can also be detected with a commensurate degree of accuracy.

<Second Embodiment>

Next, referring to FIGS. 6 to 9 showing a second embodiment, a driving signal generating circuit 30A is connected to each of the markers 20. In addition, an electric power conveying magnetic field transmitting device 80 and a driving signal generating circuit 30B are used in the apparatus main body S.

Figure 7:
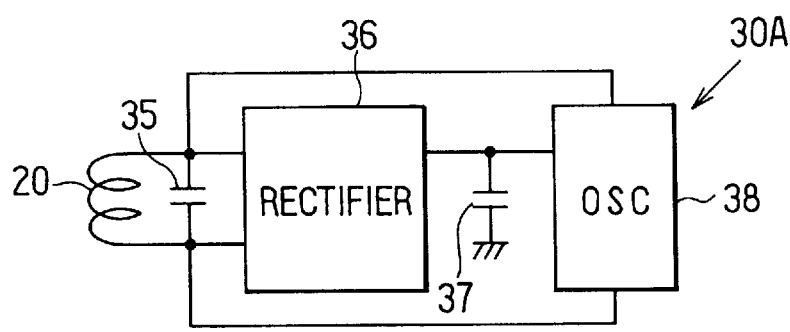
FIG. 7 is a detailed circuit diagram of a driving signal generating circuit employed in the second embodiment.

As shown in FIG. 7, the driving signal generating circuit 30A comprises a capacitor 35 constituting a parallel resonance circuit in conjunction with the marker 20, a voltage rectifying circuit 36 connected to the capacitor 35, a capacitor 37 forming an electric charge accumulating circuit in conjunction with the voltage rectifying circuit 36 and an oscillation circuit 38 driven by the capacitor 37.

When the marker 20 receives electric power of a magnetic field generated by the electric power conveying magnetic field transmitting device 80, the marker 20 generates alternating current electric power by electromagnetic induction, causing parallel resonance in conjunction with the capacitor 35. As a result, a resonance voltage with a sinusoidal waveform is output from the capacitor 35 to the voltage rectifying circuit 36.

The voltage rectifying circuit 36 rectifies the sinusoidal resonance voltage coming from the capacitor 35, accumulating electric charge of the rectified voltage in the capacitor 37. Supplied with electric charge by the capacitor 37, the oscillation circuit 38 oscillates, causing parallel resonance to take place in the parallel resonance circuit. As a result, the marker 20 transmits alternating current magnetic field as a resonance magnetic field.

Used for supplying electric power to the markers 20, the electric power conveying magnetic field transmitting device 80 is implemented by an electromagnetic coil. The electric power conveying magnetic field transmitting device 80 is installed at the lateral center of the bumper B of a vehicle. The center axis of the electric power conveying magnetic field transmitting device 80 is oriented in the vertical direction. In addition, in order to assure a sufficient supply of electric power, the electric power conveying magnetic field transmitting device 80 has the opening area larger than the opening area of each of the markers 20.

Figure 8:
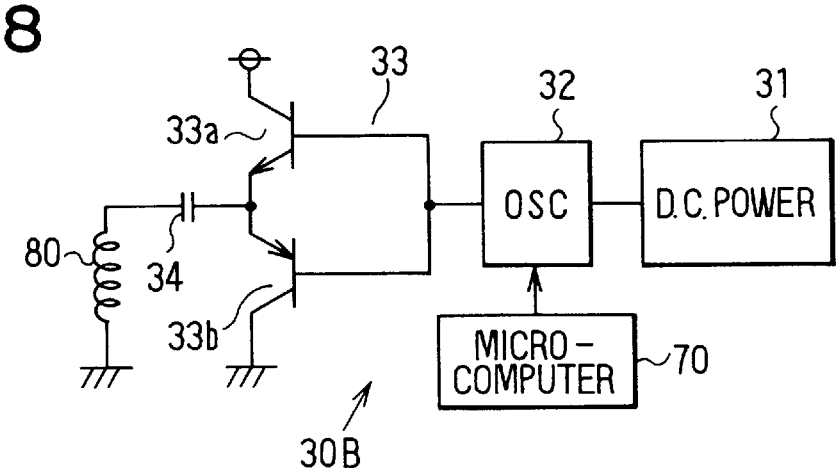
FIG. 8 is a detailed circuit of a driving signal generating circuit employed in the second embodiment.

As shown in FIG. 8, the driving signal generating circuit 30B has the similar circuit configuration as the driving signal generating circuit 30 shown in FIG. 2. In the case of the driving signal generating circuit 30B, however, the oscillation circuit 32 is connected to the microcomputer 70 and the series resonance circuit comprises the capacitor 34 and the electric power conveying magnetic field transmitting device 80 in place of the marker 20.

Driven by the driving circuit 33, the electric power conveying magnetic field transmitting device 80 generates series resonance in conjunction with the capacitor 34, transmitting an alternating current magnetic field as an electric power conveying magnetic field.

Figure 9:
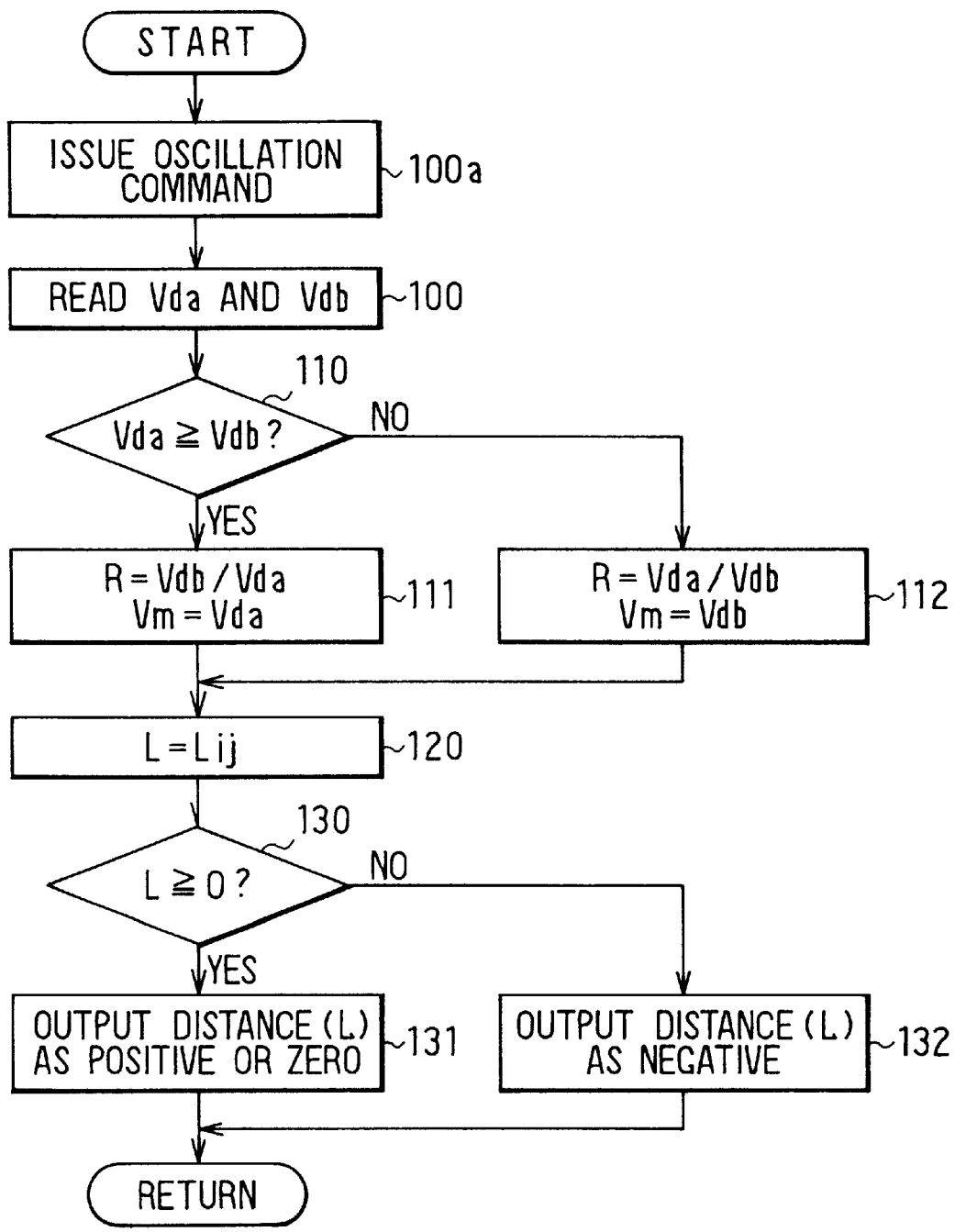
FIG. 9 is a flowchart showing operations carried out by a microcomputer employed in the second embodiment.

As shown in FIG. 9, the microcomputer 70 starts its operation from step 100a to issues an oscillation command to the oscillation circuit 32 employed in the driving signal generating circuit 30B. Supplied with electric power by the direct current power supply 31, the oscillation circuit 32 employed in the driving signal generating circuit 30B oscillates as requested by the oscillation command. When the oscillation circuit 32 oscillates, the driving circuit 33 puts the series resonance circuit comprising the capacitor 34 and the electric power conveying magnetic field transmitting device 80 in a state of series resonance as is the case with the first embodiment. As a result, the electric power conveying magnetic field transmitting device 80 transmits an alternating current magnetic field as an electric power conveying magnetic field.

When the marker 20 receives the electric power conveying magnetic field from the electric power conveying magnetic field transmitting device 80, the marker 20 lets parallel resonance take place in conjunction with the capacitor 35, accumulating electric charge in the capacitor 37 by way of the voltage rectifying circuit 36. Supplied with electric power by the capacitor 37, the oscillation circuit 38 oscillates, causing parallel resonance to take place in the parallel resonance circuit. As a result, the marker 20 transmits an alternating current magnetic field as a resonance magnetic field.

Much like the first embodiment, the magnetic field receiving devices 40a and 40b receive the alternating current magnetic fields generated by the markers 20, generating alternating current electromotive forces Va and Vb respectively.

Then, the program goes on to step 100 at which the detection voltages Vda and Vdb generated by the voltage detecting circuits 60a and 60b respectively are read by the microcomputer 70. Much like the first embodiment, the detection voltages Vda and Vdb are results of detection of the alternating current electromotive forces Va and Vb through the capacitors 50a and 50b respectively.

Subsequent process steps carried out at steps 110 to 132 are the same as those of the first embodiment. As described above, in the case of the second embodiment, the electric power conveying magnetic field transmitting device 80 and the driving signal generating circuit 30B are provided in the vehicle, and the electric power conveying magnetic field generated by electromagnetic induction by the electric power conveying magnetic field transmitting device 80 is transmitted to the markers 20. Receiving the electric power conveying magnetic field, the markers 20 each generate an alternating current magnetic field, to provide the same effect as the first embodiment.

<Third Embodiment>

In a third embodiment shown in FIGS. 10 to 14, two magnetic field receiving devices 40A and 40B as well as two voltage detecting circuits 60A and 60B are newly added to the apparatus main body S of the second embodiment.

The magnetic field receiving devices 40A and 40B are installed typically on the front bumper B of the vehicle at positions symmetrical with respect to the lateral center of the bumper B. The magnetic field receiving devices 40A and 40B are each an electromagnetic coil. The electromagnetic coils of the magnetic field receiving devices 40A and 40B have a uniform shape and are wound in the same direction.

The magnetic field receiving device 40A is in a crossing relation against the magnetic field receiving device 40a at the center of the magnetic field receiving device 40a. similarly, the magnetic field receiving device 40B is in a crossing relation against the magnetic field receiving device 40b at the center of the magnetic field receiving device 40b.

Thus, the center axis of the magnetic field receiving device 40A is perpendicular to the center axis of the magnetic field receiving device 40a and the center axis of the magnetic field receiving device 40B is perpendicular to the center axis of the magnetic field receiving device 40b. In the orthogonal coordinate system shown in FIG. 10, the forward moving direction of the vehicle is taken as the X axis direction, the axis direction of the magnetic field receiving devices 40a and 40b is taken as the Z axis direction and the axis direction of the magnetic field receiving devices 40A and 40B is taken as the Y axis direction.

In this arrangement, the two magnetic field receiving devices 40A and 40B each receive an alternating current magnetic field generated by the marker 20, generating an alternating current electromotive force.

When the marker 20 is located between the two magnetic field receiving devices 40a and 40b as shown in FIG. 11A, the alternating current electromotive forces generated by the two magnetic field receiving devices 40A and 40B have phases opposite to each other as shown in FIG. 11B. On the other hand, the alternating current electromotive forces generated by the two magnetic field receiving devices 40a and 40b have the same phase as shown in FIG. 11B.

Figure 12A:
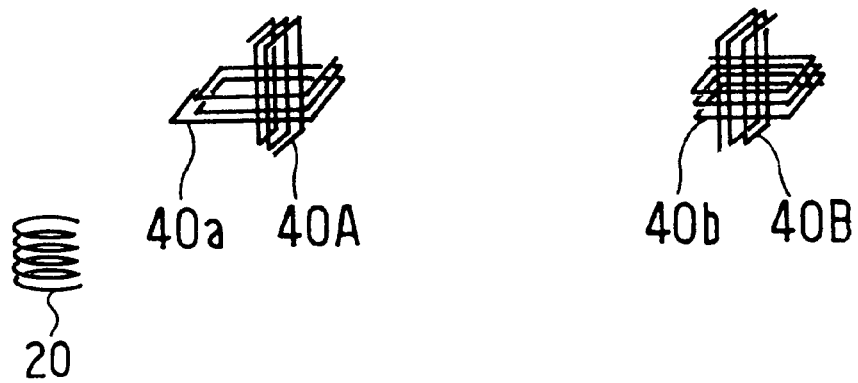
FIG. 12A is a schematic view showing positions of magnetic field receiving devices and a marker employed in the third embodiment.
Figure 12B:
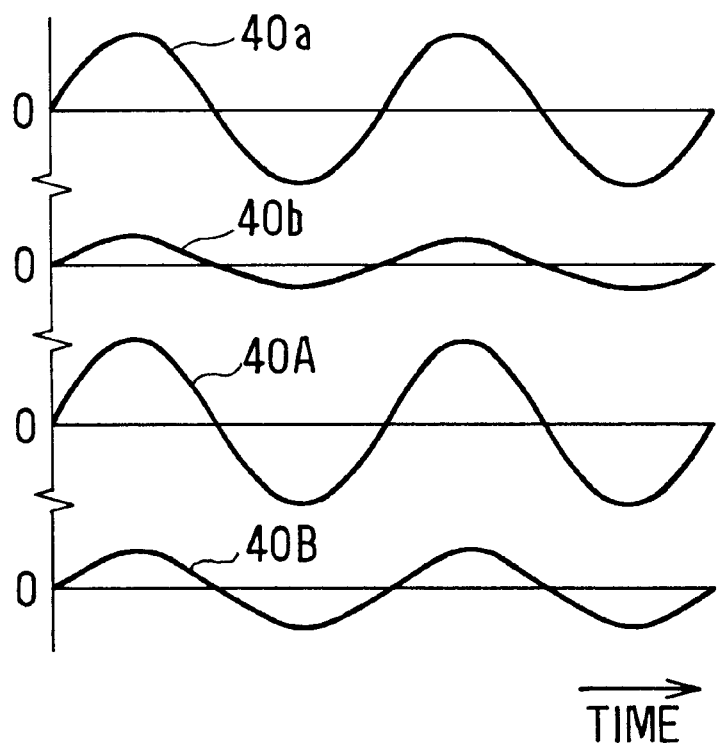
FIG. 12B is a waveform chart showing signals generated by the magnetic field receiving devices shown in FIG. 12A.

When the marker 20 is located on the left side of the magnetic field receiving device 40a as shown in FIG. 12A, the alternating current electromotive forces generated by the two magnetic field receiving devices 40A and 40B have the same phase as shown in FIG. 12B. Likewise, the alternating current electromotive forces generated by the two magnetic field receiving devices 40a and 40b also have the same phase as shown in FIG. 12B.

In the case of the locations of the marker 20 shown in FIGS. 11A and 12A, the marker 20 is closer to the magnetic field receiving devices 40A than to the magnetic field receiving devices 40B. As a result, the alternating current electromotive force generated by the magnetic field receiving device 40A is greater than that generated by the magnetic field receiving device 40B. Likewise, the marker 20 is closer to the magnetic field receiving devices 40a than to the magnetic field receiving devices 40b. As a result, the alternating current electromotive force generated by the magnetic field receiving device 40a is greater than that generated by the magnetic field receiving device 40b.

Forming a parallel resonance circuit in conjunction with the magnetic field receiving device 40A, a capacitor 50A causes parallel resonance in the parallel resonance circuit including the magnetic field receiving device 40A, generating a resonance voltage. Likewise, forming a parallel resonance circuit with the magnetic field receiving device 40B, a capacitor 50B causes parallel resonance in the parallel resonance circuit including the magnetic field receiving device 40B, generating a resonance voltage.

The voltage detecting circuit 60A detects the amplitude of the resonance voltage generated by the capacitor 50A, generating a detection voltage Vday. Similarly, the voltage detecting circuit 60B detects the amplitude of the resonance voltage generated by the capacitor 50B, generating a detection voltage Vdby. In the third embodiment, the voltage detecting circuits 60a and 60b detect the amplitudes of the resonance voltages generated by the capacitors 50a and 50b respectively, generating detection voltages Vdaz and Vdbz respectively as is the case with the first embodiment. The detection voltages Vdaz and Vdbz are the same as the detection voltages Vda and Vdb in the first embodiment.

Figure 13:
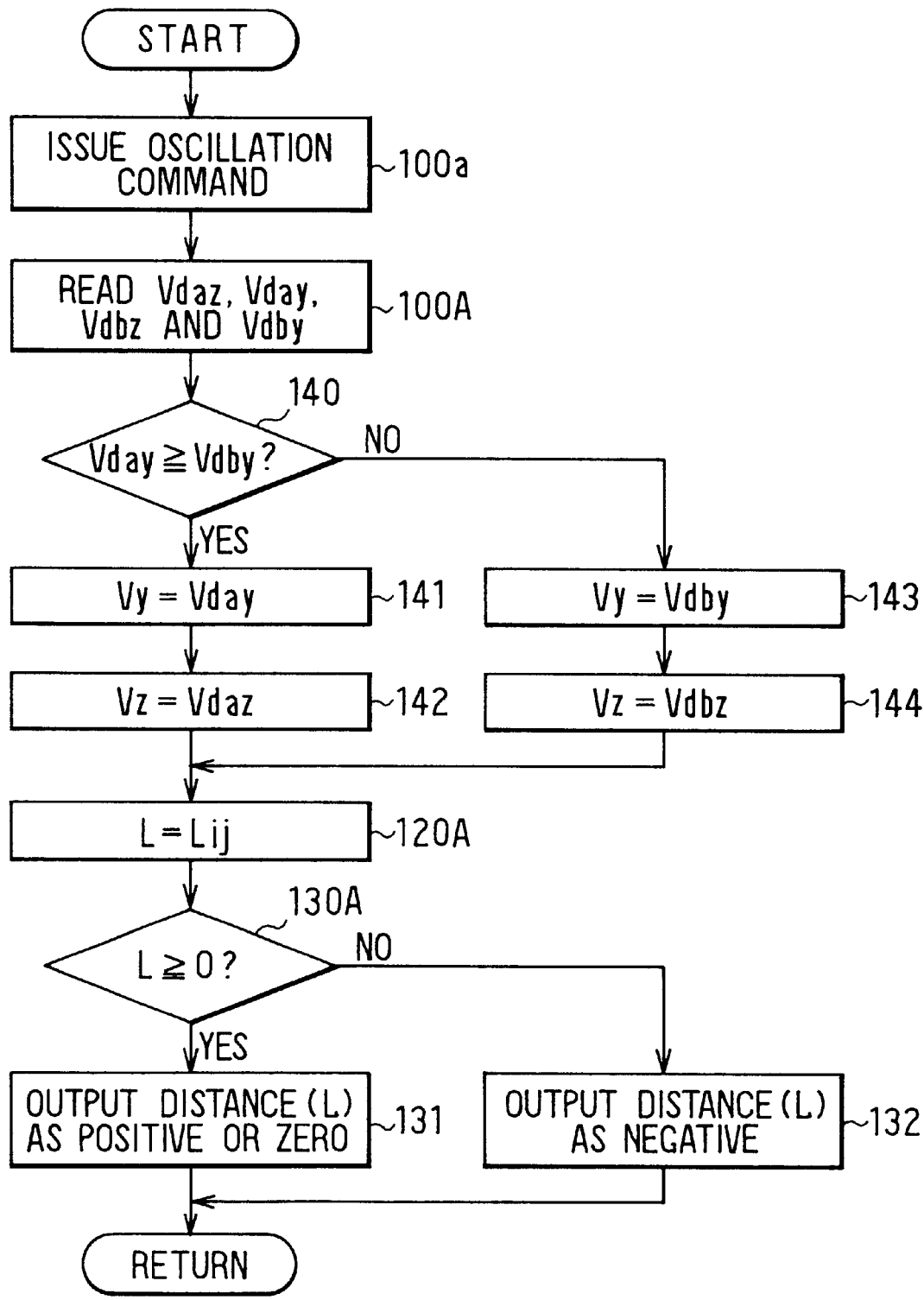
FIG. 13 is a flowchart showing operations carried out by a microcomputer employed in the third embodiment.

The microcomputer 70 executes a program shown by a flowchart of FIG. 13 in place of the flowchart of FIG. 9. In addition, in the case of the third embodiment, a map shown in FIG. 14 is used as data for finding the distance L in place of the map shown in FIG. 5. The map shown in FIG. 14 is provided for finding a value Lij of the distance L from a value Vyi of a voltage Vy and a value Vzj of a voltage Vz where the voltages Vy and Vz are the detection voltages described as follows.

If the amplitude of the detection voltage Vday generated by the voltage detecting circuit 60A is greater than the amplitude of the detection voltage Vdby generated by the voltage detecting circuit 60B, the detection voltages Vday and Vdaz are taken as values Vyi and Vzj of the voltages Vy and Vz respectively. If the amplitude of the detection voltage Vdby generated by the voltage detecting circuit 60B is greater than the amplitude of the detection voltage Vday generated by the voltage detecting circuit 60A, on the other hand, the detection voltages Vdby and Vdbz are taken as values Vyi and Vzj of the voltages Vy and Vz respectively.

It should be noted that the suffixes i and j of the values Vyi and Vzj are 0, 1, 2, - - - and so on. The map shown in FIG. 14 is stored in the ROM unit of the microcomputer 70 in advance in place of the map shown in FIG. 5.

As shown in FIG. 13, the microcomputer 70 issues at step 100a an oscillation command as is the case with the second embodiment. As a result, the electric power conveying magnetic field transmitting device 80 transmits an alternating current magnetic field as an electric power conveying magnetic field to the marker 20. Receiving the electric power conveying magnetic field from the electric power conveying magnetic field transmitting device 80, the marker 20 transmits an alternating current magnetic field. Receiving the alternating current magnetic field from the marker 20, the two magnetic field receiving devices 40a and 40b and the two magnetic field receiving devices 40A and 40B each generate an alternating current electromotive force.

The two magnetic field receiving devices 40A and 40B are not affected by a static magnetic field discussed in the description of the first embodiment as is the case with the two magnetic field receiving devices 40a and 40b.

Thus, the alternating current electromotive forces generated by the two magnetic field receiving devices 40A and 40B each have a value with an accuracy determined only by the alternating current magnetic field transmitted by the marker 20 much like the two magnetic field receiving devices 40a and 40b.

As described above, when the two magnetic field receiving devices 40a and 40b and the two magnetic field receiving devices 40A and 40B each receive an alternating current magnetic field from the marker 20 and generate an alternating current electromotive force, a resonance voltage with a sinusoidal waveform appears across each of the capacitors 50a, 50b, 50A and 50B.

If the resonance circuits are designed so that the resonance voltages appearing across the capacitors 50A and 50B each resonate at a resonance frequency different from frequencies caused by external disturbances such as natural phenomena around the vehicle as is the case with the resonance frequency of the resonance voltages appearing across the capacitors 50a and 50b, originators of the resonance voltage can be limited to the alternating current magnetic fields generated by the markers 20, making the resonance voltages immune from external disturbances.

Then, much like the first embodiment, the two voltage detecting circuits 60a and 60b generate the detection voltages Vdaz and Vdbz respectively. In addition, the voltage detecting circuit 60A detects the amplitude of a resonance voltage appearing across the capacitor 50A, generating the detection voltage Vday whereas the voltage detecting circuit 60B detects the amplitude of a resonance voltage appearing across the capacitor 50B, generating the detection voltage Vdby.

As described above, in this case, the alternating current electromotive forces generated by both the magnetic field receiving devices 40A and 40B are not affected by the magnetic flux of a static magnetic field and the resonance voltages appearing across the capacitors 50A and 50B are not affected by a variety of external disturbances. As a result, the detection voltages Vday and Vdby have values with an accuracy not affected by a static magnetic field and a variety of external disturbances either as is the case with the detection voltages Vdaz and Vdbz.

Then, the program shown in FIG. 13 goes on to step 100A at which the detection voltages Vday, Vdby, Vdaz and vdbz generated by the voltage detecting circuits 60A, 60B, 60a and 60b respectively are read and converted into digital data by the microcomputer 70. The digital conversion voltages represented by the digital data are referred to hereafter as the detection voltages Vday, Vdby, Vdaz and Vdbz.

The program then goes on to step 140 at which the microcomputer 70 compares the detection voltages Vday and Vdby with each other to determine which voltage is higher. If the detection voltage Vday is equal to or higher than the detection voltage Vdby, that is, if the outcome of the determination at step 140 is YES, the program proceeds to step 141 at which the detection voltage Vday is used as the value Vyi of the voltage Vy. The program then goes on to step 142 at which the detection voltage Vdaz is used as the value Vzj of the voltage Vz.

Then, the program continues to step 120A at which the value Lij of the distance L is found from the map data shown in FIG. 14 by using the detection voltage Vday as the value Vyi and the detection voltage Vdaz as the value vzj. In this case, if i=1 and j=0, for example, L10 is found as the value Lij of the distance L.

After the value Lij of the distance is determined, the program goes on to step 130A to determine whether the distance L is positive or negative. In the present case, since the detection voltage Vday is equal to or higher than the detection voltage Vdby, the outcome of the determination at step 130a is YES, indicating that the distance L is not negative. In this case, the program proceeds to step 131 at which the value Lij of the distance L is output as a positive value or a zero. The positive or zero output value Lij of the distance L represents a detected lateral position of the vehicle.

If the detection voltage Vday is lower than the detection voltage Vdby, on the other hand, the outcome of the determination at step 140 is NO. In this case, the program proceeds to step 143 at which the detection voltage Vdby is used as the value Vyi of the voltage Vy. The program then goes on to step 144 at which the detection voltage Vdbz is used as the value Vzj of the voltage Vz.

Then, the program continues to step 120A at which the value Lij of the distance L is found from the map data shown in FIG. 14 by using the detection voltage Vdby as the value Vyi and the detection voltage Vdbz as the value Vzj.

After the value Lij of the distance is determined, the program goes on to step 130A to determine whether the distance L is positive or negative. In the present case, since the detection voltage Vday is lower than the detection voltage Vdby, the outcome of the determination at step 130A is NO, indicating that the distance L is negative. In this case, the program proceeds to step 132 at which the value Lij of the distance L is output as a negative value. The negative output value Lij of the distance L represents a detected lateral position of the vehicle.

In this case, since the detection voltages Vday, Vdby, Vdaz and Vdbz each have a value with an accuracy that is not affected by a static magnetic field and external disturbances, the lateral position of the vehicle can also be detected with a commensurate degree of accuracy.

<Fourth Embodiment>

Figure 15:
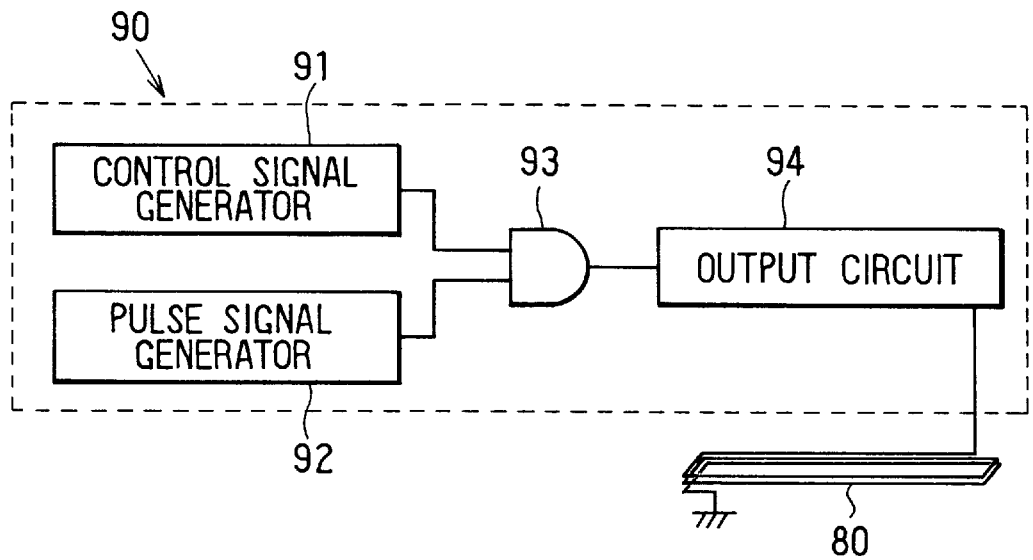
FIG. 15 is a block diagram showing a fourth embodiment of the present invention.
Figure 16:
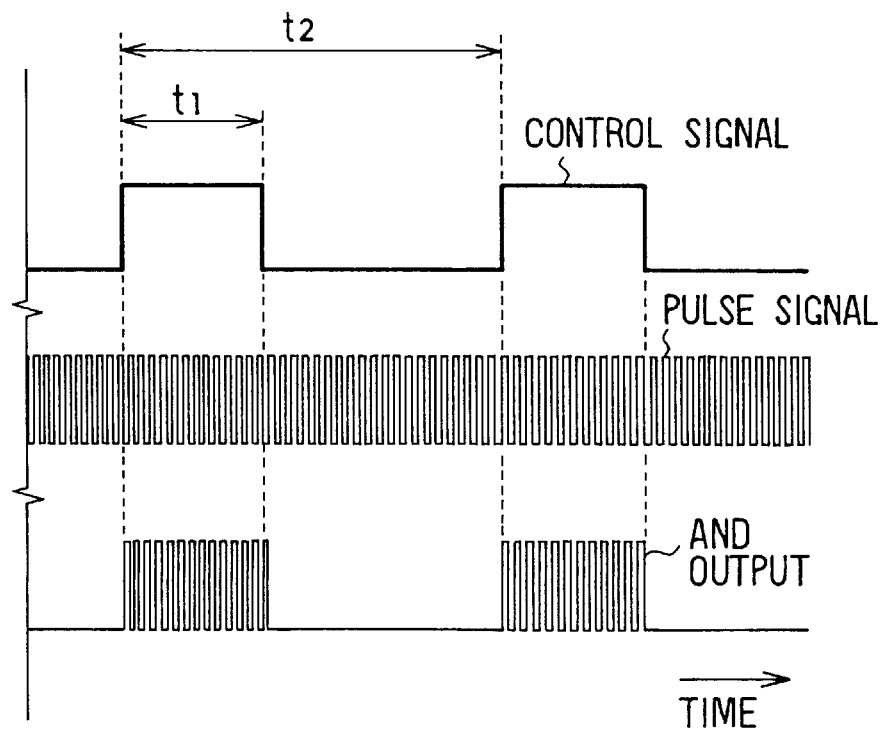
FIG. 16 is a time charts of signals generated by a control signal generating circuit, a pulse signal generating circuit and an output circuit employed in the fourth embodiment.
Figure 17:
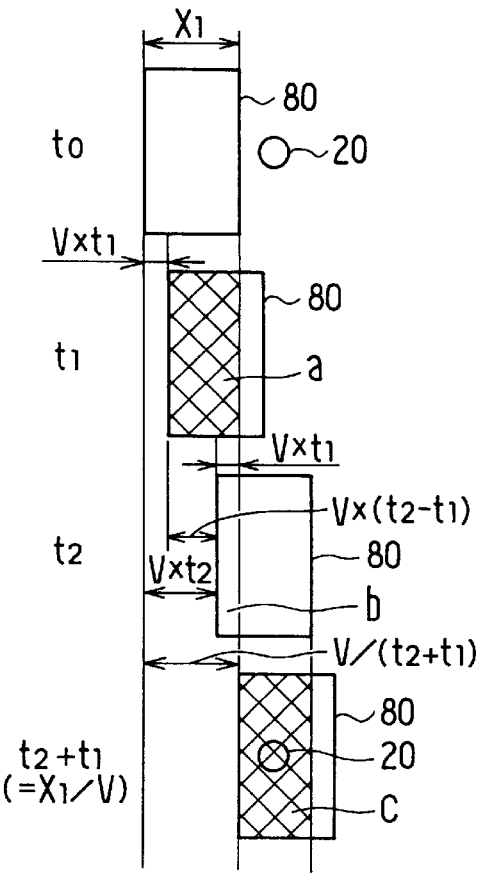
FIG. 17 is a schematic view showing a basis for Equation (1)

In a fourth embodiment shown in FIGS. 15 to 17, a driving signal generating circuit 90 is employed in place of the driving signal generating circuit 30B employed in the third embodiment.

As shown in FIG. 15, the driving signal generating circuit 90 comprises a control signal generating circuit 91. Controlled by the microcomputer 70, the control signal generating circuit 91 oscillates, generating a control signal with a pulse width of t1 and at a period of t2 as shown in FIG. 16.

By limiting the duration of an output signal generated by the output circuit 94 as shown in FIG. 16, the amount of electric power conveying magnetic field transmitting device 80 can be reduced. However, if the period t2 is too long for a given pulse width t1, the marker 20 may miss a detection of an electric power conveying magnetic field generated by the electric power conveying magnetic field transmitting device 80.

In order to avoid an erroneous detection by the markers 20, the period t2 is determined as follows, assuming that notation tmax denote a maximum time interval that can avoid the erroneous detection by the markers 20. In this case, tmax is required to satisfy the following equation:

$$t\max = (X1/v) - t1 \quad (1)$$

where the symbol v in equation (1) represents the maximum running speed of the vehicle and the symbol X1 the width of the electric power conveying magnetic field transmitting device 80 in the forward moving direction of the vehicle (the X axis direction), that is, the width in the X direction of an area of a magnetic field required for sufficiently supplying electric power to the marker 20. By setting the period t2 to satisfy t2≦tmax, the erroneous detection the marker 20 can be avoided.

Here, the basis of determining the period t2 in this way is explained with reference to FIG. 17 showing changes in position of the electric power conveying magnetic field transmitting device 80 with respect to the markers 20 as seen from a location above the road 10 with the lapse of time starting at t0. Points of time t1 and t2 shown in FIG. 17 correspond to the pulse width t1 and the period t2 of the control signal generated by the control signal generating circuit 91 as shown in FIG. 16.

At the point of time t1, after the vehicle has run at a velocity v for a period of time t1 in the X direction or in the right direction of FIG. 17, the electric power conveying magnetic field transmitting device 80 also moves by a distance of v×t1 in the x direction as seen from the start time t0.

At the point of time t2, after the vehicle has run further for a period of time (t2−t1) at the velocity v in the X direction, the electric power conveying magnetic field device 80 moves by a distance v×t2 as seen from the start time t0.

An area denoted by the symbol b in FIG. 17 is an overlap of an area occupied by the electric power conveying magnetic field transmitting device 80 at the time t0 and an area occupied by the electric power conveying magnetic field transmitting device 80 at the time t2. Assuming that the overlap area corresponds to the distance v×t1.

At the point of time (t2+t1), after the vehicle has run further for a period of time t1 at the velocity v in the X direction, the electric power conveying magnetic field transmitting device 80 moves by a distance v×(t2+t1) as seen from the start time t0.

At the point of time t2, the vehicle has moved by the distance of v×t2 in the X direction and the hatched area c is obtained by subtracting the area b from the area occupied by the electric power conveying magnetic field transmitting device 80. Thus, the hatched area denoted by the symbol c at the point of time (t2+t1) represents a segment on the time axis during which a power supply conveying magnetic field is transmitted by the electric power conveying magnetic field transmitting device 80 for the second pulse duration t1 following the point of time t2, that is, a pulse duration immediately following the first pulse duration corresponding to the hatched area a. Thus, tmax=(X1/v)−t1 expressed by equation (1) holds true.

That is, if the period t2 is set at such a value that the hatched area c of an electric power conveying magnetic field transmitted by the electric power conveying magnetic field transmitting device 80 at a point of time (t2+t1) is continuous to the hatched area a of an electric power conveying magnetic field transmitted one period earlier by the electric power conveying magnetic field transmitting device 80 at a point of time t1 on the time axis or if the relation t2≦tmax is satisfied as described above, the erroneous detection by the marker 20 can be avoided.

In the present embodiment, the period t2 is set at such a value that the relation t2≦tmax is satisfied. It should be noted that, if the control signal generating circuit 91 shown in FIG. 15 is designed so that the relation t2≦tmax is satisfied, an erroneous detection can be avoided. Since tmax is calculated with the maximum velocity v taken as a reference as indicated by equation (1), the period t2 is small enough for avoiding the erroneous detection by the marker 2 also when the vehicle is running at any velocity lower than the maximum velocity v.

Controlled by the microcomputer 70, the pulse signal generating circuit 92 oscillates, generating a pulse signal at a predetermined period. The predetermined period of the pulse signal is very short in comparison with the period t2 of the control signal.

An AND gate 93 receives the control signal generated by the control signal generating circuit 91 and the pulse signal generated by the pulse signal generating circuit 92, passing on the pulse signal generated by the pulse signal generating circuit 92 only during a period of time t2 between rising and falling edges of the control signal to the output circuit 94.

The output circuit 94 applies the pulse signal passed on thereto by the AND gate 93 to the electric power conveying magnetic field transmitting device 80.

In the fourth embodiment, when the microcomputer 70 issues an oscillation command to the control signal generating circuit 91 and the pulse signal generating circuit 92 of the driving signal generating circuit 90 at step 100a of FIG. 13, the control signal generating circuit 91 and the pulse signal generating circuit 92 generate the control signal and the pulse signal respectively.

In this way, the AND gate 93 receives the control signal generated by the control signal generating circuit 91 and the pulse signal generated by the pulse signal generating circuit 92, passing on the pulse signal only during each pulse duration t1 of the control signal to the electric power conveying magnetic field transmitting device 80 by way of the output circuit 94.

Supplied with the pulse generated by the pulse signal generating circuit 92 during each pulse duration t1 of the control signal generated by the control signal generating circuit 91, the electric power conveying magnetic field transmitting device 80 transmits an alternating current magnetic field as an electric power conveying magnetic field. Receiving the electric power conveying magnetic field, the marker 20 transmits an alternating current magnetic field during each pulse duration t1 to the magnetic field receiving devices 40a, 40b, 40A and 40B which in turn each generate an alternating current electromotive force.

Detection voltages are generated by the voltage detecting circuits 60a, 60b, 60A and 60B during each pulse duration t1, accompanying the alternating current electromotive forces. Thus, processing carried out by the microcomputer 70 after step 100A is based on the detection voltages generated by the voltage detecting circuits 60a, 60b, 60A and 60B during each pulse duration t1, being the same as the third embodiment described above.

As described above, in the fourth embodiment, the calculation of the distance L in the third embodiment is based on the electric power conveying magnetic field transmitted by the electric power conveying magnetic field 80 only during each pulse duration t1, reducing the amount of energy consumed by the lateral position detecting apparatus for each pulse duration t1 by an amount corresponding to a period (t2−t1).

Since the time duration t2 is set at a value not exceeding tmax as described above, areas in the forward moving direction of the vehicle in which the electric power conveying magnetic field 80 supplies electric power to the markers 20 through a magnetic field are contiguous on the time axis. As a result, there is no erroneous detection of the alternating current magnetic field by the magnetic field receiving devices 40a, 40b, 40A and 40B due to the erroneous detection of the electric power conveying magnetic field by the marker 20. Otherwise, the fourth embodiment provides the same effect as the third embodiment.

<Fifth Embodiment>

Figure 18:
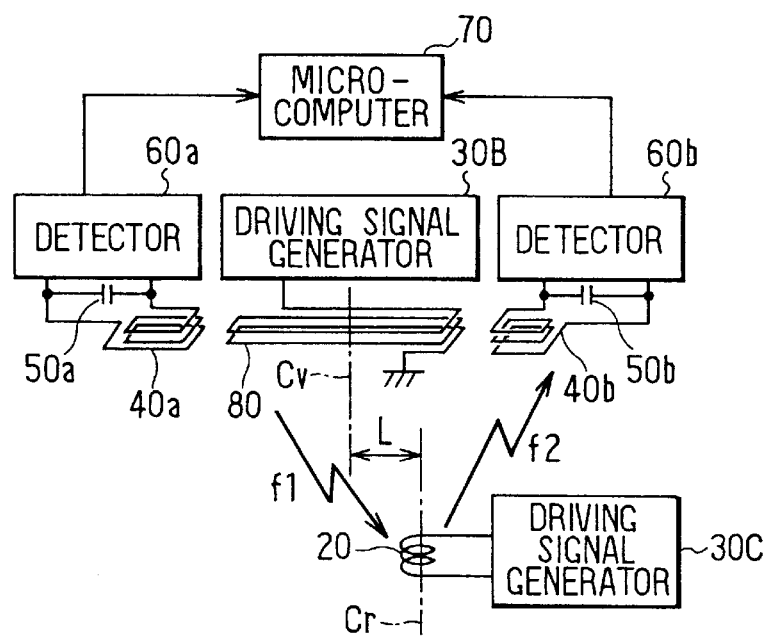
FIG. 18 is a block diagram showing a fifth embodiment of the present invention.

In a fifth embodiment shown in FIG. 18, a driving signal generating circuit 30C is employed in place of the driving signal generating circuit 30A employed in the second embodiment.

The driving signal generating circuit 30C has the same configuration as the driving signal generating circuit 30A except that an oscillation circuit of the driving signal generating circuit 30C (which corresponds to the oscillation circuit 38) puts the marker 20 and a capacitor (corresponding to the capacitor 35) in a parallel resonance state at a selected resonance frequency f2 different from the resonance frequency f1 of the series resonance circuit comprising the electric power conveying magnetic field transmitting device 80 and the capacitor 34 of the driving signal generating circuit 30B.

Thus, in the fifth embodiment, the frequency of the electric power conveying magnetic field received by the marker 20 from the electric power conveying magnetic field transmitting device 80 is different from the frequency of the alternating current magnetic field received by the two magnetic field receiving devices 40a and 40b from the marker 20.

As a result, the resonance frequency of an electric power conveying magnetic field generated by an electric power conveying magnetic field transmitting device employed in a lateral position detecting apparatus mounted on another vehicle which may be equal to the resonance frequency f1 is different from the resonance frequency f2.

Thus, even if the two magnetic field receiving devices 40a and 40b of this vehicle receive an electric power conveying magnetic field generated by an electric power conveying magnetic field transmitting device employed in a lateral position detecting apparatus mounted on another vehicle, no alternating current electromotive forces are generated. That is, electromotive forces are generated only upon reception of an alternating current magnetic field having the resonance frequency f2.

As a result, the two magnetic field receiving devices 40a and 40b never detect the distance L erroneously by reception of an electric power conveying magnetic field from another vehicle, thus providing the same effect as the second embodiment.

It should be noted that, in the present invention, the driving signal generating circuit 90 employed in the fourth embodiment can be used as a substitute not only for the driving signal generating circuit 30B of the third embodiment but also for the driving signal generating circuit 30B of the second embodiment.

Figure 6:
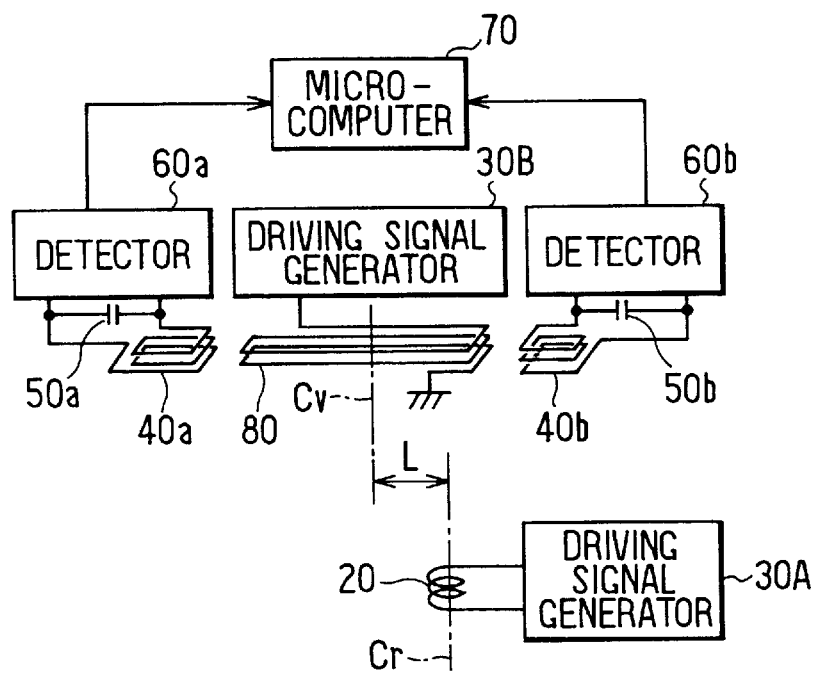
FIG. 6 is a block diagram showing an electrical circuit of a second embodiment of the present invention.

Furthermore, the magnetic receiving devices 40a and 40b shown in FIGS. 2 and 6 respectively can be replaced by the magnetic field receiving devices 40A and 40B shown in FIG. 10.

In addition, in the present invention, the parallel resonance circuit comprising the magnetic field receiving device 40a and the capacitor 50a and the parallel resonance circuit comprising the magnetic field receiving device 40b and the capacitor 50b shown in FIG. 2 can each be replaced by a series resonance circuit. similarly, the parallel resonance circuit comprising the magnetic field receiving device 40A and the capacitor 50A and the parallel resonance circuit comprising the magnetic field receiving device 40B and the capacitor 50B shown in FIG. 10 can each be replaced by a series resonance circuit.

On the contrary, the series resonance circuit comprising the marker 20 and the capacitor 34 shown in FIG. 1 can be replaced by a parallel resonance circuit. Likewise, the series resonance circuit comprising the electric power conveying magnetic field transmitting device 80 and the capacitor 34 shown in FIG. 8 can be replaced by a parallel resonance circuit.

In addition, the present invention can be applied not only to a vehicle, but also to an automatic running forklift used in a production factory and a variety of other moving bodies.

We claim:

1. A lateral position detecting apparatus for detecting a lateral position of a moving body, comprising:
    alternating current magnetic field transmitting devices installed on a surface of a running path of the moving body at a lateral center line of a running lane of the running path at predetermined intervals in a longitudinal direction;
    driving means for driving one of the alternating current magnetic field transmitting devices so that the alternating current magnetic field transmitting device transmits an alternating current magnetic field;
    alternating current magnetic field receiving means installed on a lower portion of the moving body for sequentially receiving the alternating current magnetic fields transmitted by the alternating current magnetic field transmitting devices while the moving body is moving; and
    lateral position detecting means provided on the moving body for detecting a lateral position of the moving body based on the alternating current magnetic fields sequentially received by the alternating current magnetic field receiving means,
    wherein:
        the alternating current magnetic field transmitting devices are each a magnetic field transmitting coil having an axis oriented in a vertical direction against the running path;
        the driving means each includes oscillation means driven by electric power supplied by a power supply into oscillation and a driving circuit driven by the oscillation for driving one of the magnetic field transmitting coils associated with the driving means so that the magnetic field transmitting coil transmits an alternating current magnetic field;
        the alternating current magnetic field receiving means includes a pair of magnetic field receiving coils installed on the lower portion of the moving body at positions symmetrical with respect to a lateral center line of the moving body for receiving the alternating current magnetic fields transmitted by the transmitting coils while the moving body is moving;
        the lateral position detecting means includes voltage detecting means for detecting the alternating current magnetic fields received by the magnetic field receiving coils as detection voltages, and distance determining means for determining a distance from the lateral center line of the moving body to the axis of the magnetic field transmitting coil from the detection voltages by using data representing relations among the distance, one of the detection voltages and a ratio of the another of the detection voltages to the one of the detection voltages; and
        the distance determined by the distance determining means is used as a basis for detecting the lateral position of the moving body.

2. The lateral position detecting apparatus according to claim 1, wherein:
    the driving means each have a first capacitor for constituting a resonance circuit in conjunction with the magnetic field transmitting coil;
    the oscillation of the oscillation means causes the resonance circuit to resonate, causing the magnetic field transmitting coil to transmit an alternating current magnetic field as a resonance magnetic field;
    the alternating current magnetic field receiving means has second capacitors provided for the magnetic field receiving coils to constitute resonance circuits in conjunction with the respective magnetic field receiving coils and the resonance circuits resonate when receiving the resonance magnetic field; and
    the voltage detecting means detects an amplitude of a resonance output of each second capacitor of the alternating current magnetic field receiving means associated with the voltage detecting means as the detection voltage.

3. A lateral position detecting apparatus for detecting a lateral position of a moving body, the apparatus comprising:
    an electric power conveying magnetic field transmitting device installed on a lower portion of the moving body moving along a surface of a running path:
    electric power conveying magnetic field transmitting device driving means for driving the electric power conveying magnetic field transmitting device so that the electric power conveying magnetic field transmitting device transmits an alternating current magnetic field as an electric power conveying magnetic field;
    alternating current magnetic field transmitting devices installed on the surface of the running path of the moving body at a lateral center line of a running lane of the running path at predetermined intervals for sequentially receiving the electric power conveying magnetic field transmitted by the electric power conveying magnetic transmitting device while the moving body is moving;
    alternating current magnetic field transmitting device driving means for sequentially driving the alternating current magnetic field transmitting devices based on the electric power conveying magnetic field received from the electric power conveying magnetic field transmitting devices so that the alternating current magnetic field transmitting devices each transmit an alternating current magnetic field;
    alternating current magnetic field receiving means installed on the lower portion of the moving body for sequentially receiving the alternating current magnetic fields transmitted by the alternating current magnetic field transmitting devices while the moving body is moving; and
    lateral position detecting means provided on the moving body for detecting the lateral position of the moving body on the basis of the alternating current magnetic fields sequentially received by the alternating current magnetic field receiving means, wherein:

the electric power conveying magnetic field transmitting device is an electric power conveying magnetic field transmitting coil;

the electric power conveying magnetic field transmitting device driving means drives the electric power conveying magnetic field transmitting coil so that the electric power conveying magnetic field transmitting coil transmits the electric power conveying magnetic field;

the alternating current magnetic field transmitting devices are each an alternating current magnetic field transmitting coil;

the alternating current magnetic field transmitting device driving means each includes electric power accumulating means for accumulating electric power conveyed by the electric power conveying magnetic field received by the alternating current magnetic field transmitting coil and oscillation means which receives electric power from the electric power accumulating means and oscillates, driving the alternating current magnetic field transmitting coil to transmit the alternating current magnetic field;

the alternating current magnetic field receiving means includes a pair of alternating current magnetic field receiving coils installed on the lower portion of the moving body at positions symmetrical with respect to a lateral center line of the moving body;

the lateral position detecting means includes voltage detecting means for detecting the alternating current magnetic field received by the alternating current magnetic field receiving coils respectively and outputting each result of detection as a detection voltage, and distance determining means for determining a distance from the lateral center line of the moving body to the axis of the alternating current magnetic field transmitting coil from the detection voltages by using data representing relations among distance, one of the detection voltages and a ratio of another of the detection voltages to the one of the detection voltages; and the distance determined by the distance determining means is used for detecting the lateral position of the moving body.

4. The lateral position detecting apparatus according to claim 3, wherein the electric power conveying magnetic field transmitting device driving means includes a periodically driving means for driving the electric power conveying magnetic field transmitting device so that the electric power conveying magnetic field transmitting device transmits the electric power conveying magnetic field in a period corresponding to a running speed of the moving body.

5. The lateral position detecting apparatus according to claim 3, wherein the alternating current magnetic field transmitting device driving means drives the alternating current magnetic field transmitting devices so that the alternating current magnetic field transmitting devices each transmit the alternating current magnetic field at a frequency different from a frequency at which the electric power conveying magnetic field is transmitted by the electric power conveying magnetic field transmitting device.

6. The lateral position detecting apparatus according to claim 3, wherein:

the alternating current magnetic field transmitting device driving means each have a capacitor constituting a resonance circuit in conjunction with the magnetic field transmitting coil so that the resonance circuit is driven by the electric power conveying magnetic field received by the alternating current magnetic field transmitting coil into resonance;

the alternating current magnetic field receiving means has capacitors provided for the alternating current magnetic field receiving coils to constitute resonance circuits in conjunction with the respective magnetic field receiving coils so that the resonance circuits resonate when receiving the resonance magnetic field; and the voltage detecting means detects the amplitude of a resonance output of the capacitors of the alternating current magnetic field receiving means associated with the voltage detecting means as the detection voltage.

7. A lateral position detecting apparatus for detecting a lateral position of a moving body, the apparatus comprising:

an electric power conveying magnetic field transmitting device installed on a lower portion of the moving body moving along a surface of a running path;

electric power conveying magnetic field transmitting device driving means for driving the electric sower conveying magnetic field transmitting device so that the electric power conveying magnetic field transmitting device transmits an alternating current magnetic field as an electric power conveying magnetic field;

alternating current magnetic field transmitting devices installed on the surface of the running path of the moving body at a lateral center line of a running lane of the running path at predetermined intervals for sequentially receiving the electric power conveying magnetic field transmitted by the electric power conveying magnetic transmitting device while the moving body is moving;

alternating current magnetic field transmitting device driving means for sequentially driving the alternating current magnetic field transmitting devices based on the electric power conveying magnetic field received from the electric power conveying magnetic field transmitting devices so that the alternating current magnetic field transmitting devices each transmit an alternating current magnetic field;

alternating current magnetic field receiving means installed on the lower portion of the moving body for sequentially receiving the alternating current magnetic fields transmitted by the alternating current magnetic field transmitting devices while the moving body is moving; and lateral position detecting means provided on the moving body for detecting the lateral position of the moving body on the basis of the alternating current magnetic fields sequentially received by the alternating current magnetic field receiving means, wherein:

the electric power conveying magnetic field transmitting device is an electric power conveying magnetic field transmitting coil;

the electric power conveying magnetic field transmitting device driving means drives the electric power conveying magnetic field transmitting coil so that the electric power conveying magnetic field transmitting coil transmits the electric power conveying magnetic field;

the alternating current magnetic field transmitting devices are each an alternating current magnetic field transmitting coil;

the alternating current magnetic field transmitting device driving means each includes electric power accumulating means for accumulating electric power conveyed by the electric power conveying magnetic field received by the alternating current magnetic field transmitting coil and oscillation means which receives electric power from the electric power accumulating means and oscillates, driving the alternating current magnetic field transmitting coil to transmit the alternating current magnetic field;

the alternating current magnetic field receiving means includes a pair of first alternating current magnetic field receiving coils installed on the lower portion of the moving body at positions symmetrical with respect to the lateral center line of the moving body and having an axis perpendicular to the running path, and a pair of second alternating current magnetic field receiving coils installed on the lower portion of the moving body and crossing the first alternating current magnetic field receiving coils at centers of the first alternating current magnetic field receiving coils respectively;

the lateral position detecting means includes voltage detecting means for detecting the alternating current magnetic fields received by the first alternating current magnetic field receiving coils and outputting each result of detection as a first detection voltage and second detection voltage, and distance determining means for determining a distance from the lateral center line of the moving body to the axis of the alternating current magnetic field transmitting coil from the first and second detection voltages by using data representing relations among the distance, one of the first detection voltages and corresponding one of the second detection voltages; and the distance determined by the distance measuring means is used for detecting the lateral position of the moving body.

8. The lateral position detecting apparatus according to claim 7, wherein:

the alternating current magnetic field transmitting device driving means each have a capacitor constituting a resonance circuit in conjunction with the magnetic field transmitting coil so that the resonance circuit is driven by the electric power conveying magnetic field received by the alternating current magnetic field transmitting coil into resonance;

the alternating current magnetic field receiving means has first and second capacitors constituting resonance circuits in conjunction with the first alternating current magnetic field receiving coils respectively so that the resonance circuits resonate when receiving the alternating current magnetic fields received by the first and second alternating current magnetic field receiving coils; and the voltage detecting means detects amplitudes of resonance outputs of the first capacitors as the first detection voltages and detects amplitudes of resonance outputs of the second capacitors as the second detection voltages.

9. The lateral position detecting apparatus according to claim 7, wherein the electric power conveying magnetic field transmitting device driving means includes a periodically driving means for driving the electric power conveying magnetic field transmitting device so that the electric power conveying magnetic field transmitting device transmits the electric power conveying magnetic field in a period corresponding to a running speed of the moving body.

10. The lateral position detecting apparatus according to claim 7, wherein the alternating current magnetic field transmitting device driving means drives the alternating current magnetic field transmitting devices so that the alternating current magnetic field transmitting devices each transmit the alternating current magnetic field at a frequency different from a frequency at which the electric power conveying magnetic field is transmitted by the electric power conveying magnetic field transmitting device.

* * * * *